(12) United States Patent
Yoon

(10) Patent No.: US 9,008,922 B2
(45) Date of Patent: Apr. 14, 2015

(54) REFERENCE POSITION SETTING METHOD FOR AUTOMATED MANUAL TRANSMISSION

(71) Applicant: Hyundai Motor Company, Seoul (KR)

(72) Inventor: Young Min Yoon, Seoul (KR)

(73) Assignee: Hyundai Motor Company, Seoul (KR)

( * ) Notice: Subject to any disclaimer, the term of this patent is extended or adjusted under 35 U.S.C. 154(b) by 213 days.

(21) Appl. No.: 13/710,320

(22) Filed: Dec. 10, 2012

(65) Prior Publication Data

US 2014/0102236 A1  Apr. 17, 2014

(30) Foreign Application Priority Data

Oct. 11, 2012  (KR) .................. 10-2012-0112893

(51) Int. Cl.
| | | |
|---|---|---|
| B60W 10/10 | (2012.01) |
| F16H 61/68 | (2006.01) |
| F16H 59/68 | (2006.01) |
| F16H 61/28 | (2006.01) |
| F16H 61/32 | (2006.01) |
| F16H 63/20 | (2006.01) |

(52) U.S. Cl.
CPC .............. *F16H 61/68* (2013.01); *F16H 59/68* (2013.01); *F16H 61/28* (2013.01); *F16H 61/32* (2013.01); *F16H 63/20* (2013.01); *F16H 2061/283* (2013.01)

(58) Field of Classification Search
USPC .................................. 701/51, 53, 58
See application file for complete search history.

(56) References Cited

U.S. PATENT DOCUMENTS

| | | | | |
|---|---|---|---|---|
| 6,021,368 A | * | 2/2000 | Taniguchi et al. .............. | 701/51 |
| 8,019,519 B2 | * | 9/2011 | Ruebsam et al. .............. | 701/64 |
| 2006/0162476 A1 | | 7/2006 | Zimmermann et al. | |

FOREIGN PATENT DOCUMENTS

| | | |
|---|---|---|
| DE | 10 2008 000 641 A1 | 9/2009 |
| KR | 1020110011250 A | 2/2011 |
| KR | 10-2011-0092075 A | 8/2011 |
| WO | WO 03/087630 A1 | 10/2003 |

* cited by examiner

*Primary Examiner* — Edwin A Young

(74) *Attorney, Agent, or Firm* — Morgan, Lewis & Bockius LLP

(57) ABSTRACT

A reference position setting method for an automated manual transmission is allowed to initialize an accurate reference position while minimizing relative movement of a finger, and to reduce noise generated when the finger moves to an end of a shifting direction to secure quieter and faster operation capability.

5 Claims, 4 Drawing Sheets

REFERENCE POSITION SETTING METHOD FOR AUTOMATED MANUAL TRANSMISSION

CROSS-REFERENCE TO RELATED APPLICATION

The present application claims priority of Korean Patent Application Number 10-2012-0112893 filed Oct. 11, 2012, the entire contents of which application is incorporated herein for all purposes by this reference.

BACKGROUND OF INVENTION

1. Field of Invention

The present invention relates, in general, to a reference position setting method for an automated manual transmission and, more particularly, to a reference position setting method for controlling actuators in an automated manual transmission, in which shifting is performed by a selecting operation for selecting a shift rail to which a target shift range to be shifted is assigned and a shifting operation for moving the selected shift rail to shift into the target shift range, and the selecting operation and the shifting operation are realized using the actuators.

2. Description of Related Art

FIG. 1 illustrates a shift mechanism of a conventional automated manual transmission, particularly a double clutch transmission, to which the present invention can be applied.

In FIG. 1, two fingers F for a selecting operation caused by upward or downward movement and a shifting operation caused by pivoting are provided. Odd and even range selecting actuators 9 and 13 moving the two fingers in upward and downward directions, respectively, and odd and even range shifting actuators 11 and 15 pivoting the two fingers in leftward and rightward directions, respectively, are provided. As shown in FIG. 2, the two fingers F are configured so that, in respective shift gate patterns, they move up or down to perform the selecting operation, and move left or right to perform the shifting operation, thereby performing desired shifting.

Here, the odd and even range selecting actuators 9 and 13 are implemented as solenoid actuators, and the odd and even range shifting actuators 11 and 15 are configured as motors. In view of a characteristic of each motor, a separate position sensor is required to recognize a position of the finger F based on the operation of the motor. However, the position sensor increases the cost of a product, and is unfavorable in terms of configuration and weight of a package. Thus, a method of allowing a controller to accurately recognize the position of the finger F without the position sensor is required.

The following method has been used to recognize the position of the finger. In detail, the finger is forced to be located at a specific reference position when a vehicle is started. If the reference position is detected, the subsequent rotation of a motor is calculated on the basis of the reference position, and a position of the finger is followed up and recognized.

For reference, the reference positions of the two fingers F are shown in FIG. 2. Since the fingers F are not guaranteed to be located at the shown reference positions when a vehicle is started, an initialization operation of moving the fingers F to the reference positions should be performed.

The foregoing is intended merely to aid in the understanding of the background of the present invention, and is not intended to mean that the present invention falls within the purview of the related art that is already known to those skilled in the art.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Accordingly, the present invention has been made keeping in mind the above problems occurring in the related art, and the present invention is intended to propose a reference position setting method for an automated manual transmission capable of initializing an accurate reference position of each finger while minimizing relative movement of the finger, and reducing noise generated when the finger moves to initialize the reference position to secure more quiet and rapid operation capability.

Various aspects of the present invention provide for a reference position setting method for an automated manual transmission, which includes: moving a finger in selecting and shifting directions at the same time; checking that the finger moves in a diagonal direction between the selecting and shifting directions perpendicular to each other; and moving the finger in a direction opposite the selecting direction moved in the step of checking that the finger moves in the diagonal direction to choose a reference position.

According to the present invention, the reference position setting method for an automated manual transmission is allowed to initialize an accurate reference position of a finger while minimizing relative movement of the finger, and to reduce noise generated when the finger moves to an end of a shifting direction to secure quieter and faster operation capability.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
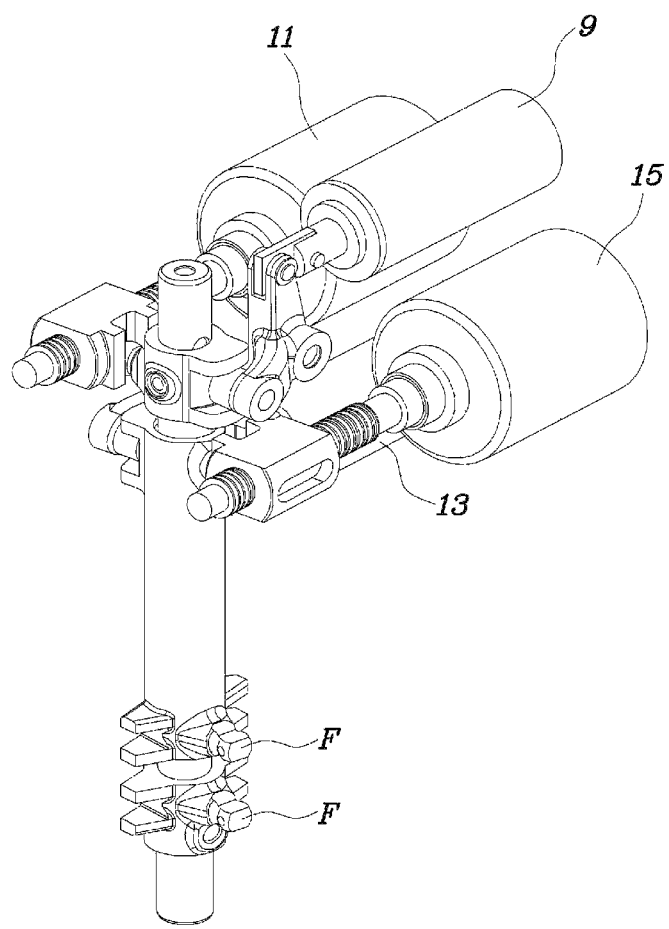
FIG. 1 illustrates a shift mechanism of an automated manual transmission in the related art.
Figure 2:
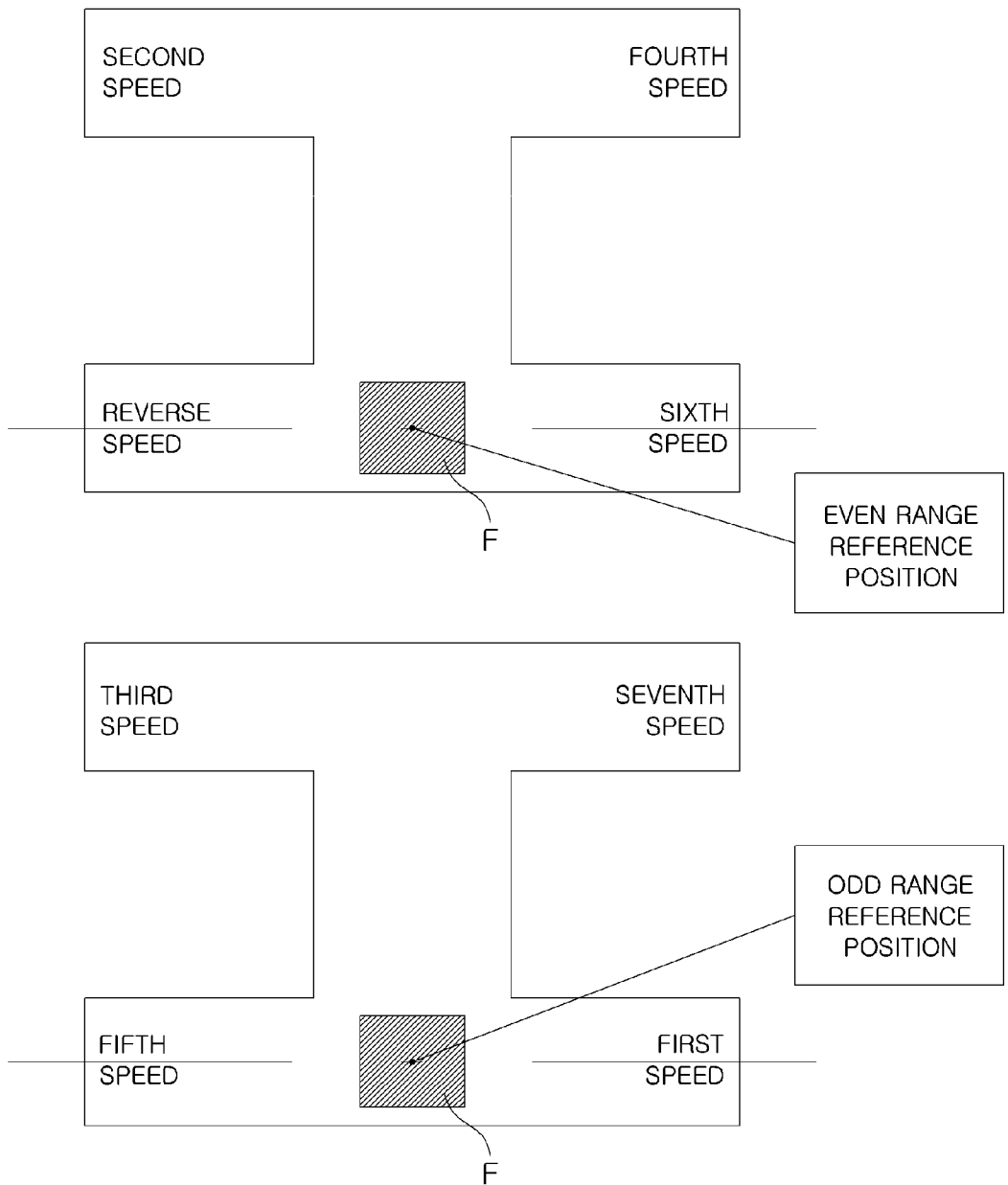
FIG. 2 shows shift gate patterns and reference positions of fingers based on the shift mechanism of FIG. 1.
Figure 3:
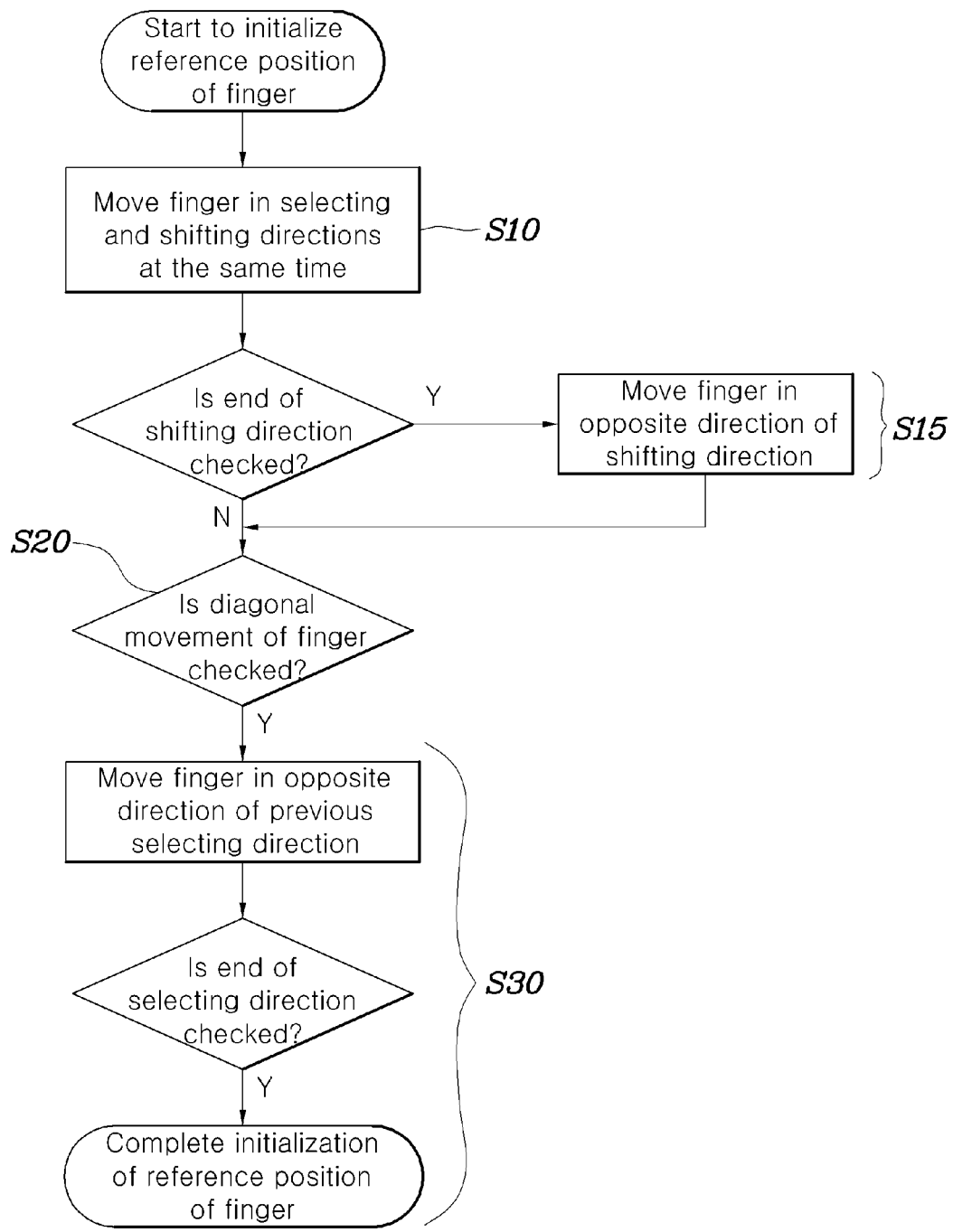
FIG. 3 is a flow chart showing a reference position setting method for an exemplary automated manual transmission in accordance with of the present invention.
Figure 4:
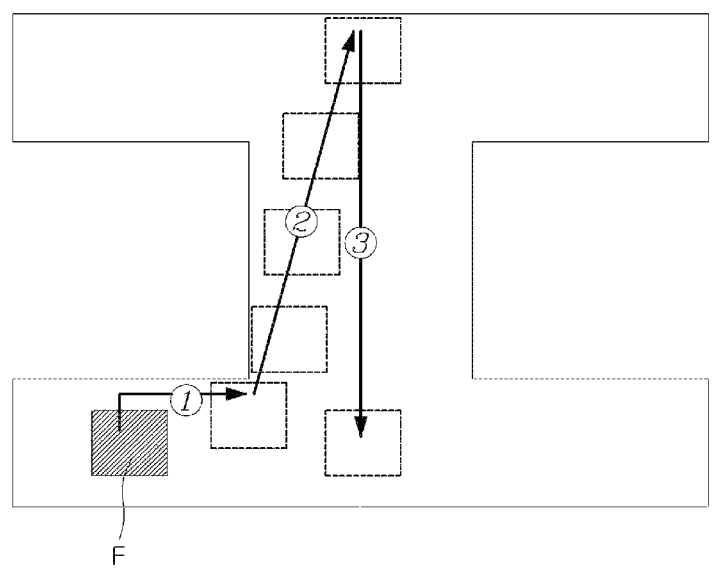
FIG. 4 is an explanatory view showing an exemplary method of initializing a reference position of each finger in accordance with the present invention.

Referring to FIGS. 3 and 4, a reference position setting method for an automated manual transmission in accordance with various embodiments of the present invention includes step S10 of moving a finger F in selecting and shifting directions at the same time, step S20 of checking whether the finger F moves in a diagonal direction between the selecting and shifting directions perpendicular to each other, and step S30 of moving the finger F in the opposite direction of the selecting direction moved in step S20 to choose a reference position.

When a vehicle enters an ignition-on state, steps S10, S20 and S30 are sequentially performed. Thereby, the reference position of the finger F is allowed to be initialized and set in a rapid and easy manner.

As can be seen from FIG. 4, when step S10 is performed, the finger F is urged to move in the selecting direction and simultaneously moves in the shifting direction. When the finger F reaches a gate of the selecting direction, the finger F moves in both the selecting and shift directions, and consequently in the diagonal direction. In step S20, this movement of the finger F is checked. In detail, when the finger F moves to one end (an upper end in FIG. 4) in the selecting direction, this is checked, and then the next step, i.e. step S30, is performed.

In step S20, the finger F is adapted to stop moving in the shifting direction between a point of time at which the finger F begins to move in the selecting direction and a point of time at which the finger F reaches one end of the selecting direction. Thereby, the finger F no longer proceeds to move in the shifting direction. As one example, in step S20, when the finger F moves to one end of the selecting direction, the finger F may be adapted to stop moving in the shifting direction.

Of course, although the finger F is adapted to stop moving in the shifting direction, the finger may be set so as to move a little further after the finger F moves to one end of the selecting direction in order to set a more accurate reference position based on a plurality of tests.

According to the present invention as described above, a distance within which the finger F moves during the initialization of the reference position of the finger F is substantially reduced over the related art, and thus it can be found that a response characteristic is much faster. Accordingly, noise is reduced, and particularly noise generated when the finger F comes into contact with one of opposite ends of the shifting direction can be utterly prevented, because the ends of the shifting direction are not checked during the initialization.

Meanwhile, when it is checked whether the finger F moves to one end of the shifting direction while performing step S10, preliminary step S15 of moving the finger F in the opposite direction of the shifting direction and in the selecting direction at the same time is performed.

This is provided for a case in which the finger F moves in a direction opposite the gate of the selecting direction in step S10.

Thus, in this case, it is checked once whether the finger F moves to the end in the shifting direction during the initialization of the reference position of the finger F. For this reason, the moving distance of the finger F is increased, and the noise is generated. However, in comparison with the related art, the moving distance of the finger F can be reduced, and the noise is thereby reduced.

Meanwhile, the aforementioned reference position setting method for an automated manual transmission is allowed to be automatically performed by an electronic control unit.

For convenience in explanation and accurate definition in the appended claims, the terms upper and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A reference position setting method for an automated manual transmission, comprising:
    moving a finger in selecting and shifting directions at the same time;
    checking whether the finger moves in a diagonal direction between the selecting and shifting directions perpendicular to each other; and
    moving the finger in a direction opposite the selecting direction moved in the step of checking that the finger moves in the diagonal direction to choose a reference position.

2. The reference position setting method according to claim 1, wherein the step of moving the finger in the direction opposite the selecting direction is performed when the finger moves to an end of the selecting direction in the step of checking that the finger moves in the diagonal direction.

3. The reference position setting method according to claim 1, wherein the step of checking whether the finger moves in the diagonal direction includes stopping the finger from moving in the shifting direction between a point of time at which the finger begins to move in the selecting direction and a point of time at which the finger reaches an end of the selecting direction.

4. The reference position setting method according to claim 1, wherein, when the finger moves to an end of the selecting direction in the step of checking whether the finger moves in the diagonal direction, the finger is stopped from moving in the shifting direction, and the step of moving the finger in the direction opposite the selecting direction is performed.

5. The reference position setting method according to claim 1, further comprising, when it is checked whether the finger moves to one end of the shifting direction while performing the step of moving the finger in the selecting and shifting directions, moving the finger in an opposite direction of the shifting direction and in the selecting direction at the same time.

* * * * *